(12) United States Patent
Melanson et al.

(10) Patent No.: US 8,014,176 B2
(45) Date of Patent: Sep. 6, 2011

(54) RESONANT SWITCHING POWER CONVERTER WITH BURST MODE TRANSITION SHAPING

(75) Inventors: John L. Melanson, Austin, TX (US); Mauro L. Gaetano, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 406 days.

(21) Appl. No.: 12/242,199

(22) Filed: Sep. 30, 2008

(65) Prior Publication Data

US 2010/0020570 A1 Jan. 28, 2010

Related U.S. Application Data

(60) Provisional application No. 61/083,717, filed on Jul. 25, 2008.

(51) Int. Cl.
*H02M 3/335* (2006.01)
(52) U.S. Cl. .................. 363/21.02; 363/21.11
(58) Field of Classification Search .............. 363/21.02, 363/21.11, 41, 95, 97
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |
| 3,725,804 A | 4/1973 | Langan | |
| 3,790,878 A | 2/1974 | Brokaw | |
| 3,881,167 A | 4/1975 | Pelton et al. | |
| 4,075,701 A | 2/1978 | Hofmann | |
| 4,334,250 A | 6/1982 | Theus | |
| 4,414,493 A | 11/1983 | Henrich | |
| 4,476,706 A | 10/1984 | Hadden et al. | |
| 4,677,366 A | 6/1987 | Wilkinson et al. | |
| 4,683,529 A | 7/1987 | Bucher | |
| 4,697,210 A | 9/1987 | Toyota et al. | |

(Continued)

FOREIGN PATENT DOCUMENTS

EP 1014563 6/2000

(Continued)

OTHER PUBLICATIONS

"AN-H52 Application Note: HV9931 Unity Power Factor LED Lamp Driver" Mar. 7, 2007, Supertex Inc., Sunnyvale, CA, USA.

(Continued)

*Primary Examiner* — Adolf Berhane
*Assistant Examiner* — Emily Pham
(74) *Attorney, Agent, or Firm* — Mitch Harris, Atty at Law, LLC; Andrew M. Harris

(57) ABSTRACT

A resonant switching power converter having burst mode transitioning operates during low or zero load conditions with reduced audible noise and component stresses, while improving efficiency. Pulse bursts are generated with a beginning and/or ending pulse duration that differs from mid-burst pulse durations, in order to reduce an amplitude of transients otherwise generated at the beginning and/or end of the bursts. Alternatively, the spacing between the pulses at the beginning and/or end of the bursts may differ from the spacing between the pulses in the middle of the bursts to reduce the transient(s). A number of pulses at the beginning and/or end of the burst can also be set with gradually varying durations, to further reduce component stress and audible vibration in a transformer that couples the resonant tank to the output of the converter.

26 Claims, 5 Drawing Sheets

U.S. PATENT DOCUMENTS

| | | | |
|---|---|---|---|
| 4,700,188 A | 10/1987 | James | |
| 4,737,658 A | 4/1988 | Kronmuller et al. | |
| 4,797,633 A | 1/1989 | Humphrey | |
| 4,937,728 A * | 6/1990 | Leonardi | 363/97 |
| 4,940,929 A | 7/1990 | Williams | |
| 4,973,919 A | 11/1990 | Allfather | |
| 4,979,087 A | 12/1990 | Sellwood et al. | |
| 4,980,898 A * | 12/1990 | Silvian | 375/295 |
| 4,992,919 A | 2/1991 | Lee et al. | |
| 4,994,952 A | 2/1991 | Silva et al. | |
| 5,001,620 A | 3/1991 | Smith | |
| 5,109,185 A | 4/1992 | Ball | |
| 5,121,079 A | 6/1992 | Dargatz | |
| 5,206,540 A | 4/1993 | de Sa e Silva et al. | |
| 5,264,780 A | 11/1993 | Bruer et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A | 6/1995 | Inou et al. | |
| 5,477,481 A | 12/1995 | Kerth | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,691,890 A | 11/1997 | Hyde | |
| 5,747,977 A | 5/1998 | Hwang | |
| 5,757,635 A | 5/1998 | Seong | |
| 5,764,039 A | 6/1998 | Choi et al. | |
| 5,768,111 A | 6/1998 | Zaitsu | |
| 5,781,040 A | 7/1998 | Myers | |
| 5,783,909 A | 7/1998 | Hochstein | |
| 5,798,635 A | 8/1998 | Hwang et al. | |
| 5,834,858 A | 11/1998 | Crosman, III et al. | |
| 5,900,683 A | 5/1999 | Rinehart et al. | |
| 5,929,400 A | 7/1999 | Colby et al. | |
| 5,946,202 A | 8/1999 | Balogh | |
| 5,946,206 A * | 8/1999 | Shimizu et al. | 363/65 |
| 5,952,849 A | 9/1999 | Haigh et al. | |
| 5,960,207 A | 9/1999 | Brown | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,150,774 A | 11/2000 | Mueller et al. | |
| 6,181,114 B1 | 1/2001 | Hemena et al. | |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 | 5/2001 | Redl et al. | |
| 6,246,183 B1 | 6/2001 | Buonavita | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus et al. | |
| 6,343,026 B1 | 1/2002 | Perry | |
| 6,344,811 B1 | 2/2002 | Melanson | |
| 6,385,063 B1 | 5/2002 | Sadek et al. | |
| 6,407,691 B1 | 6/2002 | Yu | |
| 6,441,558 B1 | 8/2002 | Muthu et al. | |
| 6,445,600 B2 | 9/2002 | Ben-Yaakov | |
| 6,452,521 B1 | 9/2002 | Wang | |
| 6,469,484 B2 | 10/2002 | L'Hermite et al. | |
| 6,495,964 B1 | 12/2002 | Muthu et al. | |
| 6,509,913 B2 | 1/2003 | Martin, Jr. et al. | |
| 6,580,258 B2 | 6/2003 | Wilcox et al. | |
| 6,583,550 B2 | 6/2003 | Iwasa et al. | |
| 6,628,106 B1 | 9/2003 | Batarseh et al. | |
| 6,636,003 B2 | 10/2003 | Rahm et al. | |
| 6,646,848 B2 | 11/2003 | Yoshida et al. | |
| 6,688,753 B2 | 2/2004 | Calon et al. | |
| 6,713,974 B2 | 3/2004 | Patchornik et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,741,123 B1 | 5/2004 | Anderson et al. | |
| 6,753,661 B2 | 6/2004 | Muthu et al. | |
| 6,768,655 B1 | 7/2004 | Yang et al. | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shytenberg et al. | |
| 6,956,750 B1 | 10/2005 | Eason et al. | |
| 6,958,920 B2 | 10/2005 | Mednik et al. | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 | 12/2005 | Kim et al. | |
| 6,980,446 B2 | 12/2005 | Simada et al. | |
| 7,003,023 B2 | 2/2006 | Krone et al. | |
| 7,034,611 B2 | 4/2006 | Oswal et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,126,288 B2 | 10/2006 | Ribarich et al. | |
| 7,135,824 B2 | 11/2006 | Lys et al. | |
| 7,145,295 B1 | 12/2006 | Lee et al. | |
| 7,158,573 B2 | 1/2007 | Hershbarger | |
| 7,158,633 B1 | 1/2007 | Hein | |
| 7,161,816 B2 | 1/2007 | Shytenberg et al. | |
| 7,183,957 B1 | 2/2007 | Melanson | |
| 7,212,640 B2 | 5/2007 | Bizjak | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,255,457 B2 | 8/2007 | Ducharm et al. | |
| 7,266,001 B1 | 9/2007 | Notohamiprodjo et al. | |
| 7,272,585 B2 | 9/2007 | Nomura et al. | |
| 7,288,902 B1 | 10/2007 | Melanson | |
| 7,289,054 B1 | 10/2007 | Watanabe | |
| 7,292,013 B1 | 11/2007 | Chen et al. | |
| 7,310,244 B2 | 12/2007 | Yang et al. | |
| 7,331,226 B2 | 2/2008 | Feldman et al. | |
| 7,345,458 B2 | 3/2008 | Kanal et al. | |
| 7,375,476 B2 | 5/2008 | Walter et al. | |
| 7,382,635 B2 | 6/2008 | Noda | |
| 7,394,210 B2 | 7/2008 | Ashdown | |
| 7,511,437 B2 | 3/2009 | Lys et al. | |
| 7,538,499 B2 | 5/2009 | Ashdown | |
| 7,545,130 B2 | 6/2009 | Latham | |
| 7,554,473 B2 | 6/2009 | Melanson | |
| 7,569,996 B2 | 8/2009 | Holmes et al. | |
| 7,583,136 B2 | 9/2009 | Pelly | |
| 7,656,103 B2 | 2/2010 | Shteynberg et al. | |
| 7,710,047 B2 | 5/2010 | Shteynberg et al. | |
| 7,746,043 B2 | 6/2010 | Melanson | |
| 7,746,671 B2 * | 6/2010 | Radecker et al. | 363/21.03 |
| 7,750,738 B2 | 7/2010 | Bach | |
| 7,804,256 B2 | 9/2010 | Melanson | |
| 2002/0145041 A1 | 10/2002 | Muthu et al. | |
| 2002/0150151 A1 | 10/2002 | Krone et al. | |
| 2002/0166073 A1 | 11/2002 | Nguyen et al. | |
| 2003/0095013 A1 | 5/2003 | Melanson et al. | |
| 2003/0174520 A1 | 9/2003 | Bimbaud | |
| 2003/0223255 A1 | 12/2003 | Ben-Yaakov | |
| 2004/0004465 A1 | 1/2004 | McGinnis | |
| 2004/0046683 A1 | 3/2004 | Mitamura et al. | |

| | | | |
|---|---|---|---|
| 2004/0085030 A1 | 5/2004 | Laflamme et al. | |
| 2004/0085117 A1 | 5/2004 | Melbert et al. | |
| 2004/0169477 A1 | 9/2004 | Yanai et al. | |
| 2004/0227571 A1 | 11/2004 | Kuribayashi | |
| 2004/0228116 A1 | 11/2004 | Miller et al. | |
| 2004/0232971 A1 | 11/2004 | Kawasaki et al. | |
| 2004/0239262 A1 | 12/2004 | Ido et al. | |
| 2005/0057237 A1 | 3/2005 | Clavel | |
| 2005/0156770 A1 | 7/2005 | Melanson | |
| 2005/0168492 A1 | 8/2005 | Hekstra et al. | |
| 2005/0184895 A1 | 8/2005 | Petersen et al. | |
| 2005/0207190 A1 | 9/2005 | Gritter | |
| 2005/0253533 A1 | 11/2005 | Lys et al. | |
| 2005/0270813 A1 | 12/2005 | Zhang et al. | |
| 2005/0275354 A1 | 12/2005 | Hausman, Jr. et al. | |
| 2005/0275386 A1 | 12/2005 | Jepsen et al. | |
| 2006/0022916 A1 | 2/2006 | Aiello | |
| 2006/0023002 A1 | 2/2006 | Hara et al. | |
| 2006/0125420 A1 | 6/2006 | Boone et al. | |
| 2006/0214603 A1 | 9/2006 | Oh et al. | |
| 2006/0226795 A1 | 10/2006 | Walter et al. | |
| 2006/0238136 A1 | 10/2006 | Johnson, III et al. | |
| 2006/0261754 A1 | 11/2006 | Lee | |
| 2006/0285365 A1 | 12/2006 | Huynh et al. | |
| 2007/0024213 A1 | 2/2007 | Shteynberg et al. | |
| 2007/0029946 A1 | 2/2007 | Yu et al. | |
| 2007/0040512 A1 | 2/2007 | Jungwirth et al. | |
| 2007/0053182 A1 | 3/2007 | Robertson | |
| 2007/0103949 A1 | 5/2007 | Tsuruya | |
| 2007/0124615 A1 | 5/2007 | Orr | |
| 2007/0182699 A1 | 8/2007 | Ha et al. | |
| 2007/0231009 A1 | 10/2007 | Watahiki | |
| 2008/0012502 A1 | 1/2008 | Lys | |
| 2008/0043504 A1* | 2/2008 | Ye et al. | 363/97 |
| 2008/0054815 A1 | 3/2008 | Kotikalapoodi et al. | |
| 2008/0130322 A1 | 6/2008 | Artusi et al. | |
| 2008/0174291 A1 | 7/2008 | Hansson et al. | |
| 2008/0174372 A1 | 7/2008 | Tucker et al. | |
| 2008/0175029 A1* | 7/2008 | Jung et al. | 363/79 |
| 2008/0192509 A1 | 8/2008 | Dhuyvetter et al. | |
| 2008/0224635 A1 | 9/2008 | Hayes | |
| 2008/0232141 A1 | 9/2008 | Artusi et al. | |
| 2008/0239764 A1* | 10/2008 | Jacques et al. | 363/21.04 |
| 2008/0259655 A1 | 10/2008 | Wei et al. | |
| 2008/0278132 A1 | 11/2008 | Kesterson et al. | |
| 2009/0067204 A1* | 3/2009 | Ye et al. | 363/97 |
| 2009/0174479 A1 | 7/2009 | Yan et al. | |
| 2009/0190384 A1 | 7/2009 | Thompson | |
| 2009/0191837 A1 | 7/2009 | Nanda et al. | |
| 2009/0218960 A1 | 9/2009 | Lyons et al. | |
| 2010/0020569 A1 | 1/2010 | Melanson et al. | |
| 2010/0020573 A1 | 1/2010 | Melanson et al. | |

FOREIGN PATENT DOCUMENTS

| | | |
|---|---|---|
| EP | 1164819 | 12/2001 |
| EP | 1213823 | 6/2002 |
| EP | 1528785 | 5/2005 |
| EP | 1768257 A1 | 3/2007 |
| EP | 2204905 A1 | 7/2010 |
| GB | 2069269 | 8/1981 |
| GB | 2262673 A | 6/1993 |
| WO | WO 91/13417 | 9/1991 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 02/27944 | 4/2002 |
| WO | WO 02/091805 | 11/2002 |
| WO | WO 2006/067521 | 6/2006 |
| WO | WO 2006/135584 | 12/2006 |
| WO | WO 2007/026170 | 3/2007 |
| WO | WO 2007/079362 | 7/2007 |

OTHER PUBLICATIONS

"HV9931 Unity Power Factor LED Lamp Driver, Initial Release", Supertex Inc., Sunnyvale, CA USA2005.

A. Prodic, Compensator Design and Stability Assessment for Fast Voltage Loops of Power Factor Correction Rectifiers, IEEE Transactions on Power Electronics, vol. 22, No. 5, Sep. 2007.

A. R. Seidel et al., A Practical Comparison Among High-Power-Factor Electronic Ballasts with Similar Ideas, IEE Transactions on Industry Applications, vol. 41, No. 6, Nov.-Dec. 2005.

A. Silva De Morais et al., A High Power Factor Ballast Using a Single Switch with Both Power Stages Integrated IEEE Transactions on Power Electronics, vol. 21, No. 2, Mar. 2006.

AD7400 Datasheet, "Isolated Sigma-Delta Modulator", Analog Devices 2006.

Allegro Microsystems, A1442, "Low Voltage Full Bridge Brushless DC Motor Driver with Hall Commutation a Soft-Switching, and Reverse Battery, Short Circuit, and Thermal Shutdown Protection," Worcester MA, 2009.

Analog Devices, "120 kHz Bandwidth, Low Distortion, Isolation Amplifier", AD215, Norwood, MA, 1996.

Analog Devices, "Isolated Sigma-Delta Modulator", AD7400, Analog Devices, Norwood, MA, 2006.

Azoteq, IQS17 Family, IQ Switch®—ProxSense™ Series, Touch Sensor, Load Control and User Interface, IQS17 Datasheet V2.00.doc, Jan. 2007.

B.A. Miwa et al., High Efficiency Power Factor Correction Using Interleaved Techniques, Applied Power Electronic Conference and Exposition, Seventh Annual Conference Proceedings, Feb. 23-27, 1992.

BB3656 Datasheet "Transformer Coupled Isolation Amplifier", Burr-Brown 1987.

Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.

Burr_Brown, "Transformer Coupled Isolation Amplifier", BB3656 Datasheet, Tucson, AZ, 1987.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

C. Dilouie, Introducing the LED Driver, EC&M, Sep. 2004.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

Color Temperature, www.sizes.com/units/color_tem perature.htm, printed Mar. 27, 2007.

D.K.W. Cheng et al., A New Improved Boost Converter with Ripple Free Input Current Using Coupled Inductors, Power Electronics and Variable Speed Drives, Sep. 21-23, 1998.

Dallas Semiconductor, Maxim, "Charge-Pump and Step-Up DC-DC Converter Solutions for Powering White LEDs in Series or Parallel Connections," Apr. 23, 2002.

Doyle et al., Feedback Control Theory, Macmillan Publishing Co., 1990.

Erickson, Robert W. et al, "Fundamentals of Power Electronics," Second Edition, Chapter 6, Boulder, CO, 2001.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Fairchild Semiconductor, Application Note 42030, Theory and Application of the ML4821 Average Current Mode PFC Controller, Oct. 25, 2000.

Fairchild Semiconductor, Application Note 42030, Theory and Application of the ML4821 Average Current Mode PFC Controller, Aug. 1997.

Fairchild Semiconductor, Application Note 42047 Power Factor Correction (PFC) Basics, Rev. 0.9.0 Aug. 19, 2004.

Fairchild Semiconductor, Application Note AN4121, Design of Power Factor Correction Circuit Using FAN7527B, Rev.1.0.1, May 30, 2002.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVA Average Current PFC Controller, Rev. 1.0.1 Aug. 10, 2001.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, FAN7532, Ballast Controller, Rev. 1.0.2, Jun. 2006.
Fairchild Semiconductor, FAN7544, Simple Ballast Controller, Rev. 1.0.0, 2004.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
Fairchild Semiconductor, ML4812, Power Factor Controller, Rev. 1.0.4, May 3, 2001
Fairchild Semiconductor, ML4821, Power Factor Controller, Rev. 1.0.2, Jun. 19, 2001.
Feng, et al. "Ultra Fast Fixed-Frequency Hysteretic Buck Converter With Maximum Charging Current Control and Adaptive Delay Compensation for DVS Applications", IEEE JSSC, IEEE Press, New Jersey, Nov. 2001.
Freescale Semiconductor, AN1965, Design of Indirect Power Factor Correction Using 56F800/E, Jul. 2005.
Freescale Semiconductor, AN3052, Implementing PFC Average Current Mode Control Using the MC9S12E128, Nov. 2005.
Freescale Semiconductor, Inc., Dimmable Light Ballast with Power Factor Correction, Design Reference Manual, DRM067, Rev. 1, Dec. 2005.
H. L. Cheng et al., A Novel Single-Stage High-Power-Factor Electronic Ballast with Symmetrical Topology, IEEE Transactions on Power Electronics, vol. 50, No. 4, Aug. 2003.
H. Peng et al., Modeling of Quantization Effects in Digitally Controlled DC-DC Converters, IEEE Transactions on Power Electronics, vol. 22, No. 1, Jan. 2007.
H. Wu et al., Single Phase Three-Level Power Factor Correction Circuit with Passive Lossless Snubber, IEEE Transactions on Power Electronics, vol. 17, No. 2, Mar. 2006.
International Rectifier, Application Note AN-1077,PFC Converter Design with IR1150 One Cycle Control IC, rev. 2.3, Jun. 2005.
International Rectifier, Data Sheet No. PD60230 revC, IR1150(S)(PbF), uPFC One Cycle Control PFC IC Feb. 5, 2007.
International Rectifier, Data Sheet PD60230 revC, Feb. 5, 2007.
International Rectifier, IRAC1150-300W Demo Board, User's Guide, Rev 3.0, Aug. 2, 2005.
Intersil, "Designing with the ISL6752, ISL6753 ZVS Full-Bridge Controllers," Application Note AN1262.0, Aug. 15, 2006.
J. Qian et al., New Charge Pump Power-Factor-Correction Electronic Ballast with a Wide Range of Line Input Voltage, IEEE Transactions on Power Electronics, vol. 14, No. 1, Jan. 1999.
J. Turchi, Four Key Steps to Design a Continuous Conduction Mode PFC Stage Using the NCP1653, on Semiconductor, Publication Order No. AND184/D, Nov. 2004.
J. Zhou et al., Novel Sampling Algorithm for DSP Controlled 2 kW PFC Converter, IEEE Transactions on Power Electronics, vol. 16, No. 2, Mar. 2001.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
K. Leung et al., "Use of State Trajectory Prediction in Hysteresis Control for Achieving Fast Transient Response the Buck Converter," Circuits and Systems, 2003. ISCAS apos;03. Proceedings of the 2003 International Symposium, vol. 3, Issue , May 25-28, 2003 pp. III-439-III-442 vol. 3.
Light Dimmer Circuits, www.epanoram a.net/documents/lights/lightdimmer.html, printed Mar. 26, 2007.
Light Emitting Diode, http://en.wikipedia.org/wiki/Light-emitting_diode, printed Mar. 27, 2007.
Linear Technology LT1950 Datasheet.
Linear Technology LTC3705 Datasheet, 2005 Linear Technology, Inc.
Linear Technology, 100 Watt LED Driver, Linear Technology, 2006.
Linear Technology, LT1248, Power Factor Controller, Apr. 20, 2007.
Linear Technology, News Release, Triple Output LED, LT3496, Linear Technology, Milpitas, CA, May 24, 2007.
Linear Technology,"2-Switch Forward Controller and Gate Driver," LTC3705 Datasheet, Linear Technology, In Milpitas, CA, 2005.
Lu et al., International Rectifier, Bridgeless PFC Implementation Using One Cycle Control Technique, 2005.
Lu, et al, "Quasi Current Mode Control for the Phase-Shifted Series Resonant Converter," IEEE Transactions on Power Electronics, vol. 23, No. 1, p. 353-358, Jan. 2008.
M. Brkovic et al., "Automatic Current Shaper with Fast Output Regulation and Soft-Switching," S.15.C Power Converters, Telecommunications Energy Conference, 1993.
M. Madigan et al., Integrated High-Quality Rectifier-Regulators, IEEE Transactions on Industrial Electronics, vol. 46, No. 4, Aug. 1999.
M. Ponce et al., High-Efficient Integrated Electronic Ballast for Compact Fluorescent Lamps, IEEE Transactions on Power Electronics, vol. 21, No. 2, Mar. 2006.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Mammano, B., Resonant Mode Converter Topologies, Texas Instruments, 2001.
Megaman, D or S Dimming ESL, Product News, Mar. 15, 2007.
National Lighting Product Information Program, Specifier Reports, "Dimming Electronic Ballasts," vol. 7, No. 3, Oct. 1999.
Noon, Jim "UC3855A/B High Performance Power Factor Preregulator", Texas Instruments, SLUA146A, May 1996,Revised Apr. 2004.
NXP, TEA1750, GreenChip III SMPS control IC Product Data Sheet, Apr. 6, 2007.
O. Garcia et al., High Efficiency PFC Converter to Meet EN61000-3-2 and A14, Proceedings of the 2002 IEEE International Symposium on Industrial Electronics, vol. 3, 2002.
On Semconductor, NCP1606, Cost Effective Power Factor Controller, Mar. 2007.
On Semiconductor, AND8123/D, Power Factor Correction Stages Operating in Critical Conduction Mode, Sep. 2003.
On Semiconductor, NCP1605, Enhanced, High Voltage and Efficient Standby Mode, Power Factor Controller, Feb. 2007.
On Semiconductor, NCP1654, Product Review, Power Factor Controller for Compact and Robust, Continuous Conduction Mode Pre-Converters, Mar. 2007.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
P. Lee et al., Steady-State Analysis of an Interleaved Boost Converter with Coupled Inductors, IEEE Transactions on Industrial Electronics, vol. 47, No. 4, Aug. 2000.
Philips, Application Note, 90W Resonant SMPS with TEA1610 SwingChip, AN99011, 1999.
Power Integrations, Inc., "TOP200-4/14 TOPSwitch Family Three-terminal Off-line PWM Switch", XP-002524650, Jul. 1996, Sunnyvale, California.
Power Supply Design Tutorial, SMPS Block Diagram, Basic Concepts, Theory of Operation, http://www.smps.us/power-supply.html, printed Aug. 11, 2008.
Prodic, Aleksandar, "Digital Controller for High-Frequency Rectifiers with Power Factor Correction Suitable for On-Chip Implementation," IEEE, US, 2007.
Q. Li et al., An Analysis of the ZVS Two-Inductor Boost Converter under Variable Frequency Operation, IEEE Transactions on Power Electronics, vol. 22, No. 1, Jan. 2007.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.

Renesas, HA16174P/FP, Power Factor Correction Controller IC, Jan. 6, 2006.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
S. Chan et al., Design and Implementation of Dimmable Electronic Ballast Based on Integrated Inductor, IEEE Transactions on Power Electronics, vol. 22, No. 1, Jan. 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
S. Lee et al., TRIAC Dimmable Ballast with Power Equalization, IEEE Transactions on Power Electronics, vol. 20 No. 6, Nov. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
ST Microelectronics, L6574, CFL/TL Ballast Driver Preheat and Dimming, Sep. 2003.
St Microelectronics, Power Factor Corrector L6561, Jun. 2004.
Stmicroelectronics, L6563, Advanced Transition-Mode PFC Controller, Mar. 2007.
Supertex Inc., Buck-based LED Drivers Using the HV9910B, Application Note AN-H48, Dec. 28, 2007.
Supertex Inc., HV9931 Unity Power Factor LED Lamp Driver, Application Note AN-H52, Mar. 7, 2007.
Texas Instruments, "BiCMOS Advanced Phase-Shift PWM Controller Datasheet," UCC1895, UCC2895, UCC3895, Dec. 1999, Rev. Apr. 2008.
Texas Instruments, Application Note SLUA321, Startup Current Transient of the Leading Edge Triggered PFC Controllers, Jul. 2004.
Texas Instruments, Application Report SLUA308, UCC3817 Current Sense Transformer Evaluation, Feb. 2004.
Texas Instruments, Application Report SLUA369B, 350-W, Two-Phase Interleaved PFC Pre-Regulator Design Review, Mar. 2007.
Texas Instruments, SLOS318F, "High-Speed, Low Noise, Fully-Differential I/O Amplifiers," THS4130 and THS4131, US, Jan. 2006.
Texas Instruments, Transition Mode PFC Controller, SLUS515D, Jul. 2005.
Texas Instruments, UCC3817 BiCMOS Power Factor Preregulator Evaluation Board User's Guide, Nov. 2002.
Unitrode Products From Texas Instruments, BiCMOS Power Factor Preregulator, Feb. 2006.
Unitrode Products From Texas Instruments, Programmable Output Power Factor Preregulator, Dec. 2004.
Unitrode, High Power-Factor Preregulator, Oct. 1994.
Unitrode, L. Balogh, Design Note UC3854A/B and UC3855A/B Provide Power Limiting with Sinusoidal Input Current for PFC Front Ends, SLUA196A, Nov. 2001.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
W. Zhang et al., A New Duty Cycle Control Strategy for Power Factor Correction and FPGA Implementation, IEEE Transactions on Power Electronics, vol. 21, No. 6, Nov. 2006.
Why Different Dimming Ranges? The Difference Between Measured and Perceived Light, 2000 http://www.lutron.com/ballast/pdf/LutronBallastpg3.pdf.
Y. Ji et al., Compatibility Testing of Fluorescent Lamp and Ballast Systems, IEEE Transactions on Industry Applications, vol. 35, No. 6, Nov./Dec. 1999.
Y. Ohno, Spectral Design Considerations for White LED Color Rendering, Final Manuscript, Optical Engineering, vol. 44, 111302 (2005).

Zhao, et al. "Steady-state and Dynamic Analysis of a Buck Converter Using a Hysteretic PWM Control", Power Electronics Specialists Conference, IEEE Press, New Jersey, Jun. 2004.
Maksimovic, et al., "Impact of Digital Control in Power Electronics", Proceedings of the 2004 International Symposium on Power Semiconductor Devices & ICs, pp. 13-22, Kitakyushu, JP, 2004.
L6562 Datasheet, "Transition-Mode PFC Controller", St Microelectronics, Nov. 2005, Geneva, Switzerland.
Lin et al., "Robust Controller Design for a Series Resonant Converter via Duty-Cycle Control", IEEE Transactions on Power Electronics, Sep. 1999, p. 793-802, vol. 14 No. 5.
Laouamri et al., "Modeling and Analysis of Wound Integrated LCT Structure for Single Stage Resonant PFC Rectifier", IEEE Transactions on Power Electronics, Jan. 2003, p. 256-269, vol. 18, No. 1.
Hattrup et al., "Fast Estimation Techniques for Digital Control of Resonant Converters", IEEE Transactions on Power Electronics, Jan. 2003, p. 365-372, vol. 18, No. 1.
Foster et al., "Cyclic-Averaging for High Speed Analysis of Resonant Converters", IEEE Transactions on Power Electronics, Jul. 2003, p. 985-993, vol. 18, No. 4.
Mangat et al., "A Modified Asymmetrical Pulse-Width-Modulated Resonant DC/DC Converter Topology", IEEE Transactions on Power Electronics, Jan. 2004, p. 104-111, vol. 19, No. 1.
Tuomainen et al., "Effect of Resonant Transition on Efficiency of Forward Converter with Active Clamp and Self-Driven SRs", IEEE Transactions on Power Electronics, Mar. 2005, p. 315-323, vol. 20, No. 2.
Lilei Gu et al., "Three-Level LLC Series Resonant DC/DC Converter", IEEE Transactions on Power Electronics, Jul. 2005, p. 781-789, vol. 20, No. 4.
Barragan et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.
Chen et al., "Generalized Optimal Trajectory Control for Closed Loop Control of Series-Parallel Resonant Converter", IEEE Transactions on Power Electronics, Sep. 2006, p. 1347-1355, vol. 21, No. 5.
Xie et al., "Analysis and Optimization of LLC Resonant Converter With a Novel Over-Current Protection Circuit", IEEE Transactions on Power Electronics, Mar. 2007, p. 435-443, vol. 22 No. 2.
Bhat et al., "Analysis and Design of a High-Frequency Resonant Converter Using *LCC*-Type Commutation", IEEE Transactions on Power Electronics, Oct. 1987, p. 291-301, vol. PE-2 No. 4.
De Groot et al., "Design of a 1-MHz LLC Resonant Converter Based on a DSP-Driven SOI Half-Bridge Power MOS Module", IEEE Transactions on Power Electronics, Nov. 2007, p. 2307-2320, vol. 22 No. 4.
Abramovitz et al., "A Resonant DC-DC Transformer With Zero Current Ripple", IEEE Transactions on Power Electronics, Nov. 2007, p. 2344-2351, vol. 22, No. 6.
Ye et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.
Yan Lu et al., "Quasi Current Mode Control for the Phase-Shifting Series Resonant Converter", IEEE Transactions on Power Electronics, Jan. 2008, p. 353-358, vol. 23 No. 1.
Texas Instruments BiCMOS Advanced Phase-Shift PWM Controller Datasheet, Dec. 1999, Rev. Apr. 2008.
Mamano, Bob, "Current Sensing Solutions for Power Supply Designers", Unitrode Seminar Notes SEM1200, 1999.
Texas Instruments, Interleaving Continuous Conduction Mode PFC Controller, UCC28070, SLUS794C, Nov. 2007, revised Jun. 2009, Texas Instruments, Dallas TX.
http://toolbarpdf.com/docs/functions-and-features-of-inverters.html printed on Jan. 20, 2011.

* cited by examiner

RESONANT SWITCHING POWER CONVERTER WITH BURST MODE TRANSITION SHAPING

This application Claims priority under 35 U.S.C. §119(e) to U.S. Provisional Patent Application Ser. No. 61/083,717 filed on Jul. 25, 2008.

CROSS-REFERENCE TO RELATED APPLICATION

The present U.S. Patent Application is related to U.S. patent application Ser. No. 12/241,969 entitled "AUDIBLE NOISE SUPPRESSION IN A RESONANT SWITCHING POWER CONVERTER", filed contemporaneously herewith by a common inventor and assigned to the same Assignee, and published as U.S. Patent Application Publication 20100020573A1 on Jan. 28, 2010. The disclosure of the above-referenced U.S. Patent Application is incorporated herein by reference.

BACKGROUND OF THE INVENTION

1. Field of the Invention

The present invention relates generally to switching power regulator circuits, and more specifically, to a resonant switching power converter in which pulse durations at the start and end of a burst are reduced.

2. Background of the Invention

In resonant switching power converters, as output current demand falls, the switching frequency is raised to reduce the power output. However, when low or zero-load conditions are encountered, the required switching frequency may become impractical and will typically cause a dramatic drop in efficiency due to increases in switching losses in conjunction with the relative drop in output power vs. the power consumed in ordinary switching operation. For the above reasons, a low-power "burst" mode is typically employed in low or zero output current demand periods, during which the output voltage is maintained by issuing a burst of pulses to restart oscillation of the resonant circuit at a level sufficient to re-charge the output capacitor of the resonant switching power converter. Between the bursts, the output capacitor supplies power to the load.

However, typical burst operation causes stress in the components of the resonant switching power converter, in particular, the switching transistors supply higher transient current levels at the start and end of the bursts. The transformers and/or inductors in the circuit also experience mechanical stresses, which cause audible noise and possible cumulative mechanical damage to the transformers. Finally, power is wasted in the transients generated in typical burst operation, manifesting in the above-described undesirable mechanical vibration, as well as heat.

Therefore, it would be desirable to provide a resonant switching power converter with a low-power operating mode having reduced audible vibration, reduced component stresses and improved efficiency.

SUMMARY OF THE INVENTION

The above stated objectives of providing a low-power operating mode for a resonant switching power converter having reduced audible vibration, reduced component stresses and improved efficiency is achieved in a resonant switching power converter and its method of operation.

The resonant switching power converter includes a resonant tank circuit, a switching circuit for transferring energy to the resonant tank circuit from an input voltage source, and a transformer for coupling the resonant tank circuit to an output of the switching power converter. In a low-power mode of operation, the switching circuit issues burst of pulses having non-uniform duration and/or spacing to reduce the amplitude of a beginning and/or ending transient caused by the bursts. The last pulse of the burst may have a shorter duration than the pulses in the middle of the burst, which terminates the burst substantially near the point at which inductor current has reached a zero level. The first pulse of the burst may also be shortened in duration, to avoid overshoot in the amplitude of the oscillation at the beginning of the burst. Alternatively, the spacing between the initial and/or terminal pulses of the bursts may differ from the spacing of the pulses in the middle of the bursts to cause a reduction in the transient(s).

A number of pulses at the beginning of the burst and at the end of the burst may have durations set to a predetermined pattern of pulse-widths that gradually increase at the beginning of the burst and gradually decrease at the end of the bursts, to further reduce transient current levels, stress and audible vibration due to starting and stopping resonant operation. The voltage left on the output of the switching circuit at the end of the burst may be coordinated in polarity with the pulse polarity at the beginning of the next burst, to reduce the magnitude of the voltage step occurring at the output of the switching circuit at the beginning of the first pulse of the burst. The switching circuit may further enforce that the bursts always contain an even total of complete half-cycles, so that asymmetry within each burst and between bursts is prevented.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for reducing stress on components and audible vibration in output transformers of resonant switching power converters operating in low power burst mode. The efficiency in low power burst mode is also raised, due to the reduction of burst start and stop transient conditions that otherwise waste energy.

Figure 1:
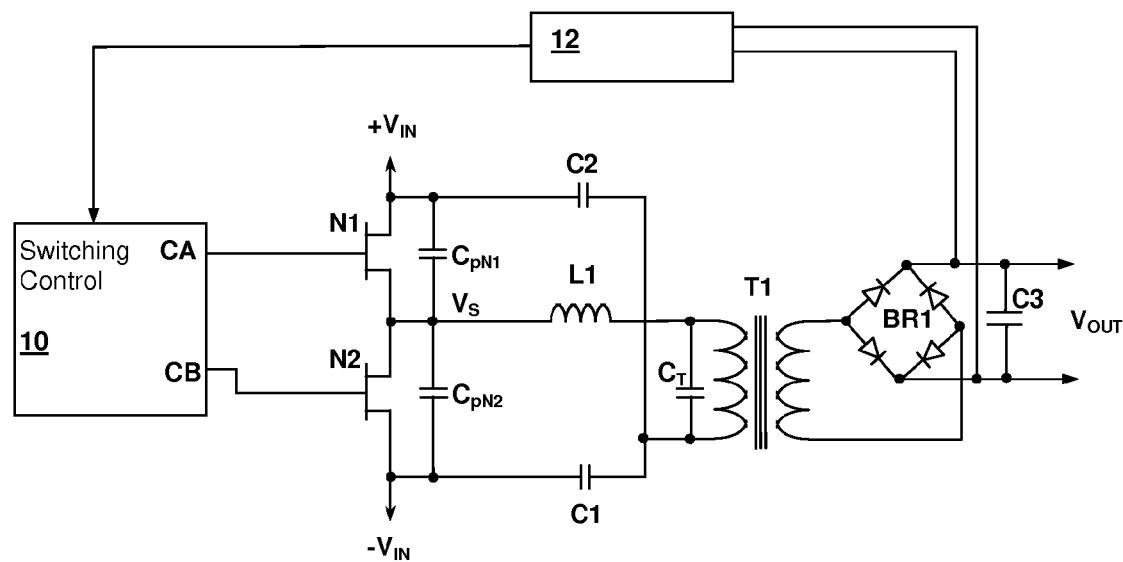
FIG. 1 is a simplified schematic diagram depicting a resonant switching power converter in accordance with an embodiment of the present invention.

Referring now to FIG. 1, a resonant switching power converter circuit in accordance with an embodiment of the present invention is shown. A switching control circuit 10 controls a switching circuit implemented by transistors N1 and N2. A series-resonant tank circuit formed by an inductance and a capacitance and is energized by the switching action of transistors N1 and N2. A transformer T1 couples energy from the resonance tank circuit to a rectifier bridge BR1 which provides rectified current for charging output capacitor C3. Output voltage $V_{OUT}$ may be maintained at a predetermined voltage during burst mode by a feedback circuit 12 that provides a feedback signal to switching control circuit 10. Alternatively, the burst mode may be "free-wheeling", such that bursts sufficient to supply load current low enough to trigger burst mode operation may be predetermined and supplied without feedback control.

In FIG. 1, the inductance of the resonant tank circuit is illustrated as an inductor L1 plus any leakage inductance of the primary winding of transformer T1. However, it is understood that the inductance of the resonant tank circuit may be entirely supplied by the leakage inductance of transformer T1 and therefore inductor L1 will not be present in some embodiments of the invention. The capacitance of the resonant tank circuit is supplied by the total series capacitance of the tank, which as illustrated includes the parallel combination of capacitors C1 and C2, the parasitic winding capacitance $C_T$ in parallel with any reflected capacitance at the primary winding of transformer T1, and when neither transistor N1 nor N2 is active, the parallel combination of the parasitic capacitances ($C_{pN1}$ and $C_{pN2}$) of transistors N1 and N2.

Under low load or open-circuit conditions, switching control circuit 10 operates in a burst mode, in order to maintain efficiency of the resonant switching power converter circuit under such conditions. Since the switching frequency generated by switching control circuit 10 is generally very high and is raised away from the resonant frequency of the series-resonant tank circuit as the load current decreases, losses due to operating switching transistors N1 and N2 are generally also high and increase with decreasing load. Therefore, to maintain output voltage $V_{OUT}$ at the desired level, it is more efficient to detect droop in output voltage $V_{OUT}$ and generate a burst of pulses from switching control circuit 10 that energizes the resonant tank to charge output capacitor C3 by an amount sufficient to ensure that the time between bursts will be quite long. Alternatively, as mentioned above, the bursts may be generated at predetermined intervals according to the minimum burst size and burst interval required to supply current at a specified minimum value of output voltage $V_{OUT}$ to a load.

Figure 2:
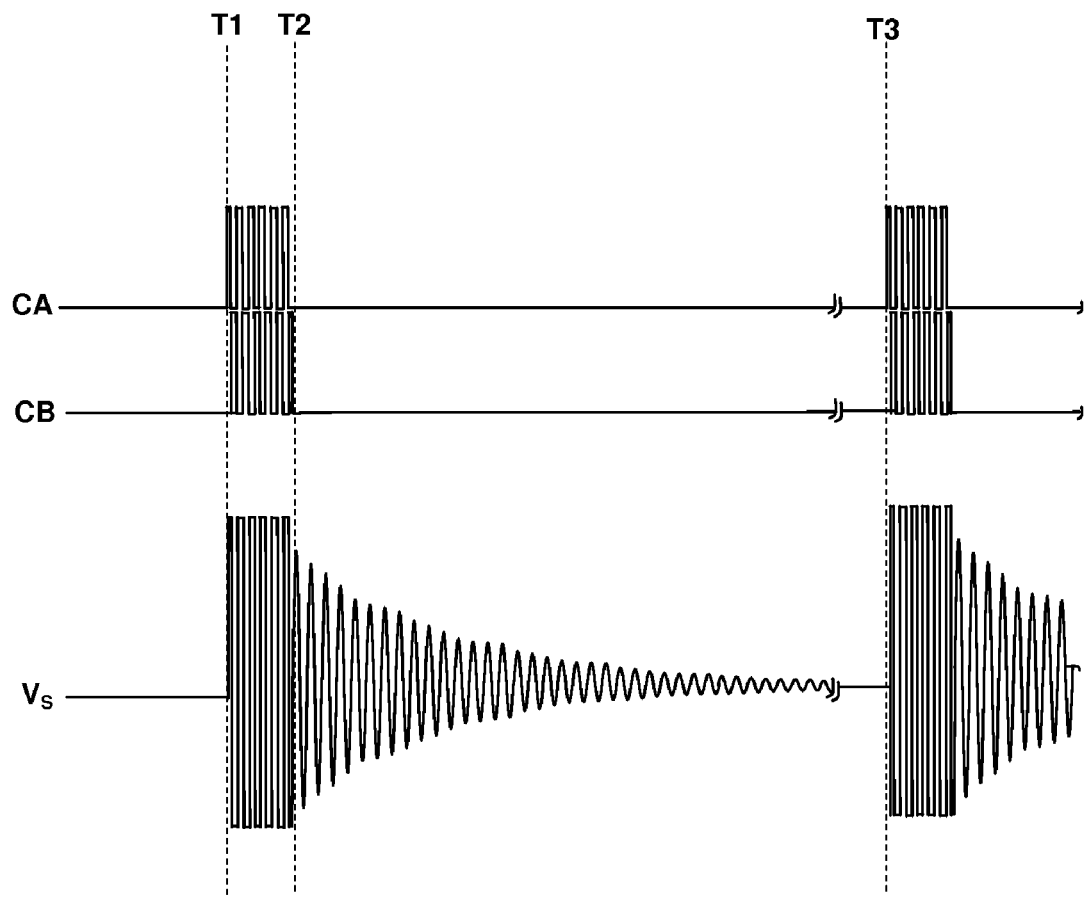
FIG. 2 is a timing diagram depicting burst mode operation of the switching power converter of FIG. 1.

Referring now to FIG. 2, burst mode operation of the resonant switching power converter circuit of FIG. 1 is illustrated in a timing diagram. At time T1, a burst commences and includes six positive pulses and six negative pulses. Control signal CA controls transistor N1 to generate the positive pulses observed in voltage $V_S$, which is supplied by the switching circuit (e.g., transistors N1 and N2 in FIG. 1) to the resonant tank circuit. Control signal CB controls transistor N2 to generate the negative pulses observed in voltage $V_S$. According to the present invention, the pulses are not of uniform duration. As illustrated, the first and last pulses of the bursts are truncated to one-half of the duration of the durations of the remainder of the pulses, which will be described in further detail below. At time T2 the first burst ends and voltage $V_S$ is no longer forced to the input voltage levels by transistors N1 and N2, but is generated by the "ringing" of the resonant tank circuit.

Figure 3:
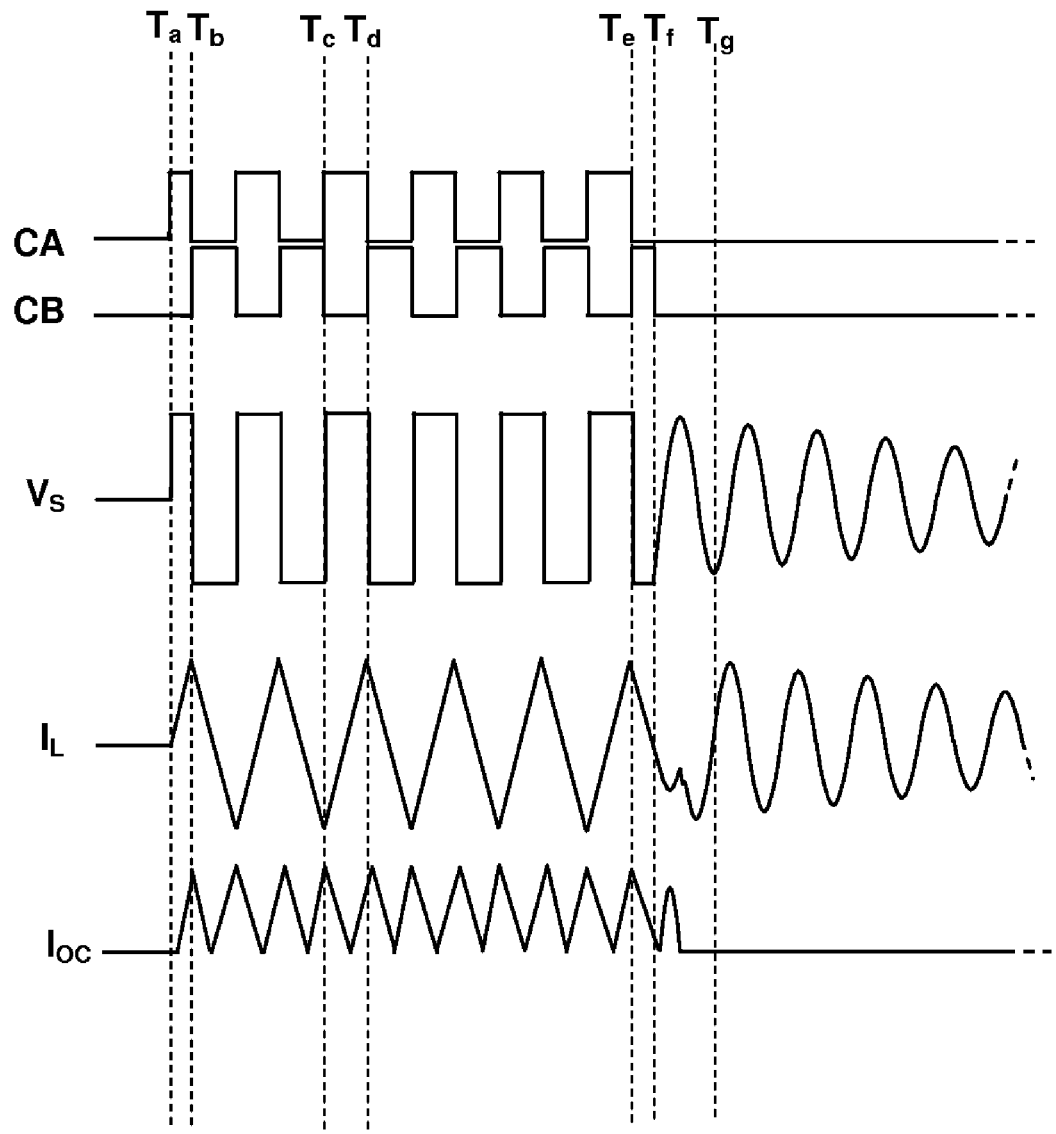
FIG. 3 is a timing diagram depicting details of a burst within the timing diagram of FIG. 2.

Referring now to FIG. 3, details of the burst mode operation of the resonant switching power converter of the present invention are further illustrated. As mentioned above, between times $T_a$ and $T_b$, a half-duration positive pulse is generated in voltage $V_S$ by the action of control signal CA. Inductor current $I_L$ through inductor L1 (or the current through whatever inductance provides the series inductance for the resonant tank circuit) rises to a peak value at time $T_b$. Subsequently, negative pulses generated by the action of control signal CB and positive pulses generated by the action of control signal CA, continue to produce substantially equal and opposite polarity peaks in inductor current $I_L$, and have a "full duration" twice that of the starting half-duration pulse, as illustrated by the duration between time $T_c$ and time $T_d$. If the first pulse of the burst were generated with a full nominal pulse duration (i.e., the same duration as the durations of the pulses in the middle of the burst), the first peak in inductor current $I_L$ would be twice the peak value in the Figure, generating a transient that will cause stress in switching transistors N1 and N2, as well as transformer T1 and the other components in series with the primary winding of transformer T1 and audible noise in transformer T1 and inductor L1 due to magneto-restriction. The resulting transient would also cause faster charging of output capacitor C3, due to larger peaks in output capacitor charging current $I_{OC}$, causing increased stress in capacitor C3 and bridge rectifier BR1.

By starting with a half-duration pulse, rather than a full duration pulse, the transient current at the beginning of each burst is eliminated. Further, at the end of each burst, a half-duration pulse of opposite polarity (negative in the illustration) is generated between times $T_e$ and $T_f$ to prevent generating similar transients at the end of the bursts. At time $T_g$ the ringing action of the resonant tank illustrates the relative phase of 90 degrees between inductor current $I_L$ and voltage $V_S$. An even number of positive and negative pulses (e.g., five full-duration pulses of positive and negative, one half-duration positive pulse and one half-duration negative pulse) is enforced to maintain the inductor current $I_L$ at a net zero average value for the burst, so that a zero inductor current starting point yields a zero inductor current endpoint for each burst. The above action ensures that the inductor current $I_L$ is not substantially interrupted by the turn-on and turn-off of transistors N1 and N2 at the beginning and end of the bursts, further reducing transient stress and audible effects.

Figure 4:
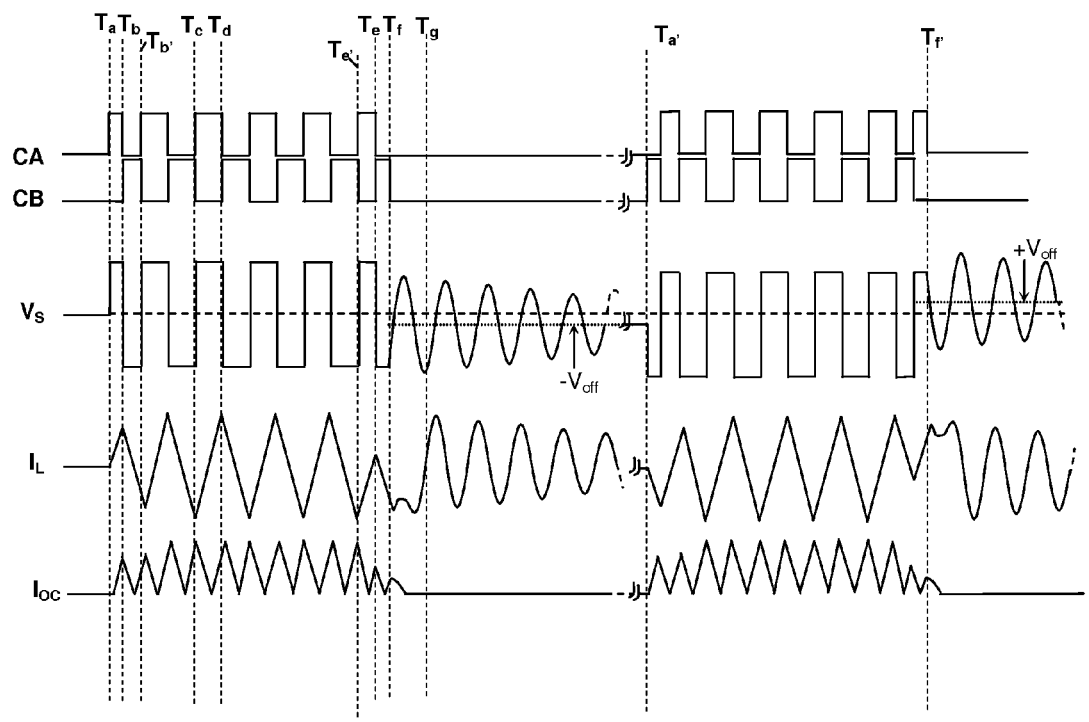
FIG. 4 is a timing diagram depicting details of a burst within the switching power converter of FIG. 1, in accordance with another embodiment of the present invention.

Referring now to FIG. 4, a burst mode in the resonant switching circuit of FIG. 1 is shown in accordance with another embodiment of the present invention. The burst mode illustrated in FIG. 4 is similar to the burst mode illustrated in FIG. 2 and FIG. 3 and therefore only differences between them will be described below. In the burst mode of FIG. 4, rather than shortening just one pulse at the beginning and end of the bursts, two or more pulses can be shortened at the beginning of the burst with respect to the nominal pulse duration (time $T_d$–time $T_c$) of the pulses in the middle of the burst. Shortening two or more pulses provides two benefits: 1) the transient behavior at the beginning and end of the burst is further relaxed; and 2) efficiency can be further improved and switching transients reduced by changing the quiescent value of $V_S$ at the end of the "ringing" of the resonant tank circuit in the direction of the switching event commencing the next pulse burst. To accomplish the second, the polarity of the first pulse (and last pulse) of each burst is alternated as shown in the figure, which can be performed by swapping the control patterns of control signals CA and CB between each burst as illustrated.

Between time $T_b$ and time $T_{b'}$, a second pulse of the burst is generated with a duration that differs from both the commencing half-duration pulse at the beginning of the burst and the full durations pulses in the middle of the burst (e.g., ¾ duration), and similarly between time $T_{e'}$ and time $T_e$, a pulse of opposite polarity and equal duration is provided to maintain net-zero average inductor current $I_L$. However, while inductor current $I_L$ is maintained at a net-zero level, voltage $V_S$ is not maintained at a zero nominal level as between the bursts. At the end of the first burst at time $T_f$, an offset voltage $-V_{off}$ remains on the output of the switching circuit (e.g., on the common connection of parasitic capacitances $C_{pN1}$ and $C_{pN2}$ of transistors N1 and N2 in FIG. 1. By alternating the polarity of the bursts (by swapping control patterns of control signals CA and CB), the pulse beginning the next burst at time $T_a'$ has a polarity equal to the polarity of the ending pulse of the last burst, and the voltage change that the switching circuit must produce is thereby reduced by the value of offset voltage $V_{off}$, which reduces stress in switching transistors N1 and N2 as well as reducing line transients. At the end of the second burst at time $T_f$, a voltage $+V_{off}$ remains in the quiescent value of voltage $V_S$, which will match the polarity of the positive pulse to be generated at the start of the next burst.

Figure 5:
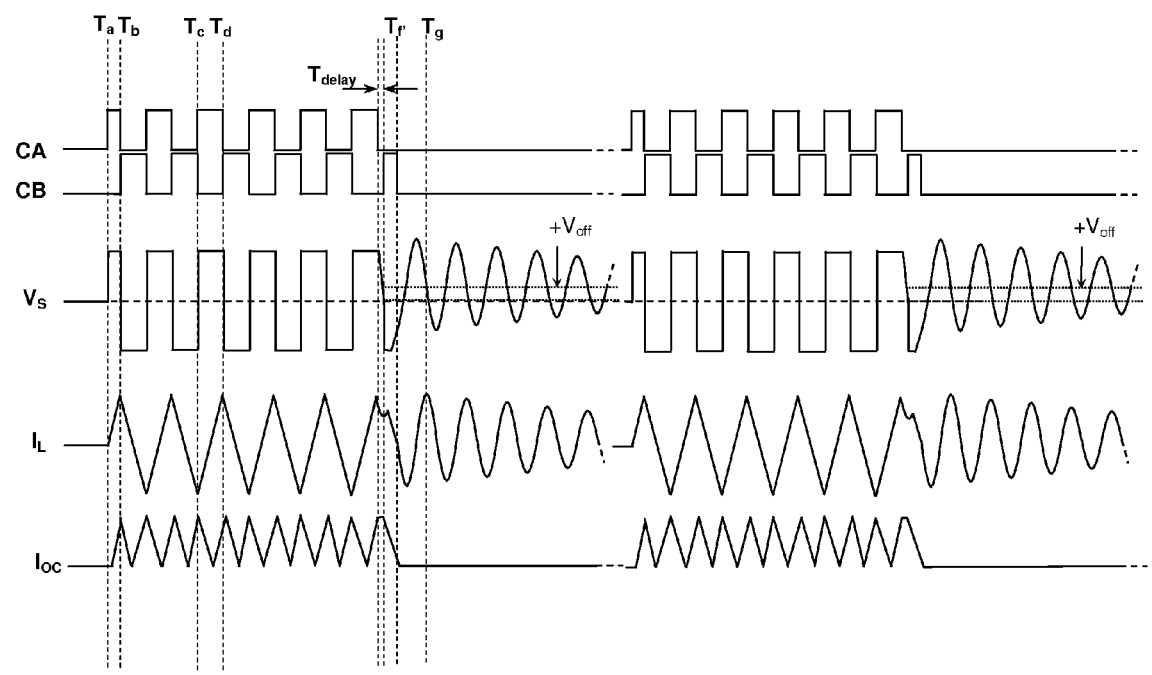
FIG. 5 is a timing diagram depicting details of a burst within the switching power converter of FIG. 1, in accordance with yet another embodiment of the present invention.

Referring now to FIG. 5, a burst mode in the resonant switching circuit of FIG. 1 is shown in accordance with yet another embodiment of the present invention. The burst mode illustrated in FIG. 5 is similar to the burst mode illustrated in FIG. 3 and FIG. 4 and therefore only differences between them will be described below. In the burst mode of FIG. 5, rather than shortening two pulses at the end of the bursts in order to set a voltage offset in voltage $V_S$ at the end of each burst, the timing between the pulses at the end of the burst can be altered. As illustrated, a half duration pulse is generated at the end of the bursts as in the embodiment illustrated in FIG. 3, but the last pulse of the burst has been delayed by a time interval $T_{delay}$. By changing the time at which inductor current $I_L$ is returned to a zero value, the value of voltage $V_S$ is altered at the zero-inductor current instant, which causes offset voltage $+V_{off}$ to remain on the output of the switching circuit in a manner similar to that illustrated in FIG. 4. By varying value $T_{delay}$, the value and polarity of offset voltage $+V_{off}$ can be controlled. In the illustrated embodiment, a positive offset voltage $+V_{off}$ is produced in the quiescent value of voltage $V_S$ at the end of each cycle, illustrating a means by which the offset can be produced and adjusted with only a change to the final pulse of the burst and in which the polarity of the initial pulse can be maintained at the same value (i.e., the patterns of switching control signals CA and CB are not "swapped" between bursts) in order to start the switching action of the next burst with a pulse polarity that matches the polarity of the voltage remaining on the output of the switching circuit. However, by further delaying the final pulse of the burst and/or altering the timing of other pulses within the burst, such alternating action can be supported and further "tuning" of the quiescent value of voltage $V_S$ at the end of each cycle can be performed.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A resonant switching power circuit, comprising:
    a resonant circuit including at least one inductance and at least one capacitance for transferring energy to an output of the resonant switching power circuit;
    a switching circuit coupled to the resonant circuit for transferring energy from an input voltage source to the resonant circuit; and
    a control circuit for controlling the switching circuit, wherein the control circuit has a burst mode of operation in which a number of pulses are generated in bursts to provide the energy to the output of the resonant switching power circuit intermittently when energy demand at the output of the resonant switching power circuit is low, wherein the pulses within the bursts have a non-uniform pattern such that at least one transient at the start or end of the burst is reduced in amplitude, and wherein at least one ending pulse or at least one beginning pulse of the bursts has a predetermined duration that differs from another predetermined duration of pulses in a middle of the bursts.

2. The resonant switching power circuit of claim 1, wherein a time interval between an initial two pulses of the bursts differs from another time interval between a second pulse and a third pulse of the bursts.

3. The resonant switching power circuit of claim 1, wherein the at least one ending pulse of the bursts is a single pulse.

4. The resonant switching power circuit of claim 3, wherein the predetermined duration of the at least one ending pulse of the bursts is substantially equal to half of the another predetermined duration of the pulses in the middle of the bursts.

5. The resonant switching power circuit of claim 1, wherein the at least one ending pulse of the bursts comprises at least two pulses.

6. The resonant switching power circuit of claim 5, wherein a polarity of a first pulse of the bursts is alternated between the bursts.

7. The resonant switching power circuit of claim 6, wherein the at least two pulses have durations such that a non-zero voltage offset is present at the output of the switching circuit after both of the at least two pulses have terminated, wherein first pulses of the bursts have the same polarity as the non-zero voltage offset, whereby a voltage step at the output of the switching circuit due to the first pulses of the bursts is reduced in magnitude.

8. The resonant switching power circuit of claim 1, wherein a polarity of a first pulse of the bursts is alternated between the bursts.

9. The resonant switching power circuit of claim 1, wherein the number of pulses in each burst is an even number of pulses.

10. The resonant switching power circuit of claim 1, wherein a start time of the at least one ending pulse of the bursts is delayed such that a non-zero voltage offset is present at the output of the switching circuit after the at least one ending pulse has terminated, wherein first pulses of the bursts have the same polarity as the offset present at the output of the switching circuit at the start of the first pulses of the bursts, whereby a voltage step at the output of the switching circuit due to the first pulses of the bursts is reduced in magnitude.

11. A method of reducing transient amplitude during low power burst mode operation in a resonant switching power circuit, the method comprising:
    transferring energy to an output of the resonant switching power circuit from a resonant tank circuit;
    transferring energy from an input voltage source to the resonant circuit by operating a switching circuit; and
    operating the switching circuit in the burst mode, in which a number of pulses are generated in bursts to provide the energy to the output of the resonant switching power circuit intermittently when energy demand at the output of the resonant switching power circuit is low, wherein the pulses within the bursts have a non-uniform pattern such that at least one transient at the start or end of the burst is reduced in amplitude, and wherein at least one ending pulse or at least one beginning pulse of the bursts has a predetermined duration that differs from another predetermined duration of pulses in a middle of the bursts.

12. The method of claim 11, wherein a time interval between an initial two pulses of the bursts differs from another time interval between a second pulse and a third pulse of the bursts.

13. The method of claim 11, wherein the at least one ending pulse of the bursts is a single pulse.

14. The method of claim 13, wherein the predetermined duration of the at least one ending pulse of the bursts is substantially equal to half of the another predetermined duration of the pulses in the middle of the bursts.

15. The method of claim 11, wherein the at least one ending pulse of the bursts comprises at least two pulses.

16. The method of claim 15, wherein a polarity of a first pulse of the bursts is alternated between the bursts.

17. The method of claim 16, wherein the at least two pulses have durations such that a non-zero voltage offset is present at the output of the switching circuit after both of the at least two pulses have terminated, wherein first pulses of the bursts have the same polarity as the non-zero voltage offset, whereby a voltage step at the output of the switching circuit due to the first pulses of the bursts is reduced in magnitude.

18. The method of claim 11, wherein a polarity of a first pulse of the bursts is alternated between the bursts.

19. The method of claim 11, wherein the number of pulses in each burst is an even number of pulses.

20. The method of claim 11, wherein a start time of the at least one ending pulse of the bursts is delayed such that a non-zero voltage offset is present at the output of the switching circuit after the at least one ending pulse has terminated, wherein first pulses of the bursts have the same polarity as the offset present at the output of the switching circuit at the start of the first pulses of the bursts, whereby a voltage step at the output of the switching circuit due to the first pulses of the bursts is reduced in magnitude.

21. An integrated circuit controller, integrated on a single die, for a controlling a resonant switching power converter, wherein the integrated circuit controller provides control signals to a switching circuit having a low-power burst mode, in which a number of pulses are generated in bursts when energy demand at an output of the resonant switching power converter is low, wherein the pulses within the bursts have a non-uniform pattern such that at least one transient at the start or end of the burst is reduced in amplitude, and wherein at least one ending pulse or at least one beginning pulse of the bursts has a predetermined duration that differs from another predetermined duration of pulses in a middle of the bursts.

22. The integrated circuit controller of claim 21, wherein the switching circuit is integrated on the die.

23. A resonant switching power circuit, comprising:
a resonant circuit including at least one inductance and at least one capacitance for transferring energy to an output of the resonant switching power circuit;
a switching circuit coupled to the resonant circuit for transferring energy from an input voltage source to the resonant circuit; and
a control circuit for controlling the switching circuit, wherein the control circuit has a burst mode of operation in which a number of pulses are generated in bursts to provide the energy to the output of the resonant switching power circuit intermittently when energy demand at the output of the resonant switching power circuit is low, wherein the pulses within the bursts have a non-uniform pattern such that a transient at the end of the burst is reduced in amplitude, and wherein at least one ending pulse of the bursts has a predetermined duration that differs from another predetermined duration of pulses in a middle of the bursts.

24. A resonant switching power circuit, comprising:
a resonant circuit including at least one inductance and at least one capacitance for transferring energy to an output of the resonant switching power circuit;
a switching circuit coupled to the resonant circuit for transferring energy from an input voltage source to the resonant circuit; and
a control circuit for controlling the switching circuit, wherein the control circuit has a burst mode of operation in which a number of pulses are generated in bursts to provide the energy to the output of the resonant switching power circuit intermittently when energy demand at the output of the resonant switching power circuit is low, wherein the pulses within the bursts have a non-uniform pattern such that a transient at the start of the burst is reduced in amplitude, and wherein at least one beginning pulse of the bursts has a predetermined duration that differs from another predetermined duration of pulses in a middle of the bursts.

25. A method of reducing transient amplitude during low power burst mode operation in a resonant switching power circuit, the method comprising:
transferring energy to an output of the resonant switching power circuit from a resonant tank circuit;
transferring energy from an input voltage source to the resonant circuit by operating a switching circuit; and
operating the switching circuit in the burst mode, in which a number of pulses are generated in bursts to provide the energy to the output of the resonant switching power circuit intermittently when energy demand at the output of the resonant switching power circuit is low, wherein the pulses within the bursts have a non-uniform pattern such that a transient at the end of the burst is reduced in amplitude, and wherein at least one ending pulse of the bursts has a predetermined duration that differs from another predetermined duration of pulses in a middle of the bursts.

26. A method of reducing transient amplitude during low power burst mode operation in a resonant switching power circuit, the method comprising:
transferring energy to an output of the resonant switching power circuit from a resonant tank circuit;
transferring energy from an input voltage source to the resonant circuit by operating a switching circuit; and
operating the switching circuit in the burst mode, in which a number of pulses are generated in bursts to provide the energy to the output of the resonant switching power circuit intermittently when energy demand at the output of the resonant switching power circuit is low, wherein the pulses within the bursts have a non-uniform pattern such that a transient at the start of the burst is reduced in amplitude, and wherein at least one beginning pulse of the bursts has a predetermined duration that differs from another predetermined duration of pulses in a middle of the bursts.

* * * * *